(12) United States Patent  
Styron

(10) Patent No.: US 6,512,828 B1
(45) Date of Patent: Jan. 28, 2003

(54) WALL MOUNTED TELEPHONE

(75) Inventor: Mark Styron, 3118 Lausanne, Pasadena, TX (US) 77505

(73) Assignee: Mark Styron ( * ) Notice: Subject to any disclaimer, the term of this patent is extended or adjusted under 35 U.S.C. 154(b) by 11 days.

(21) Appl. No.: 09/709,753

(22) Filed: Nov. 11, 2000

Related U.S. Application Data

(63) Continuation of application No. 09/459,314, filed on Dec. 10, 1999, now abandoned, which is a continuation-in-part of application No. 09/017,982, filed on Feb. 3, 1998, now Pat. No. 6,009,169.

(51) Int. Cl.[7] .............................................. H04M 1/00
(52) U.S. Cl. ...................................................... 379/453
(58) Field of Search ........................... 379/453, 433.01, 379/433.07, 428.01, 368, 420.01; 455/90

(56) References Cited

U.S. PATENT DOCUMENTS

| | | |
|---|---|---|
| 2,277,907 A | 3/1942 | Goodale, Jr. et al. |
| 3,144,513 A | 8/1964 | Sherron |
| 4,101,735 A | 7/1978 | Bridenbaugh |
| 4,104,485 A | 8/1978 | Pessel et al. |
| 5,023,936 A | * 6/1991 | Szczutkowski et al. ....... 455/90 |
| 5,371,790 A | * 12/1994 | Nevo et al. ............ 379/433.01 |
| 6,009,169 A | * 12/1999 | Styron ......................... 379/453 |

* cited by examiner

Primary Examiner—Jack Chiang
(74) Attorney, Agent, or Firm—Kenneth A. Keeling; Keeling & Hudson LLC

(57) ABSTRACT

A telephone using conventional telephone mechanical and electrical components mounted within a telephone housing, typically mounted on a wall, with the earpiece and mouthpiece mounted within the telephone. To operate, the user pushes an on/off switch, dials his number, and then places his ear next to the fixed earpiece. The telephone is designed for use in prisons so inmates within a prison can not hang themselves with a handset cord or break a handset and handset cord off for use as a weapon. The telephone is also designed for use in any high crime or remote area to reduce the potential for vandalism. The telephone design reduces the cost of maintenance by eliminating the need to fix and replace a telephone handset.

9 Claims, 4 Drawing Sheets

WALL MOUNTED TELEPHONE

CROSS-REFERENCE TO RELATED APPLICATIONS

This is a continuation under 37 CFR 1.53(b) to application Ser. No. 09/459,314, "Wall Mounted Telephone", filed on Dec. 10, 1999 now abandoned by Mark Styron, which is a continuation-in-part application under 37 CFR 1.53(b) to application Ser. No. 09/017,982, "Inmate Phone," filed on Feb. 3, 1998 now U.S. Pat. No. 6,009,169 by Mark Styron. The parent application and continuation-in-part application are under examination in Group Art Unit 2742 by Examiner J. Chiang.

STATEMENT REGARDING FEDERALLY SPONSORED RESEARCH OR DEVELOPMENT

Not applicable.

BACKGROUND OF THE INVENTION

1. Field of the Invention

This invention relates generally to telephone equipment and more specifically to a structure for a telephone for use by inmates or in other environments wherein the telephone is subject to abuse (hereinafter referred to as an inmate telephone). The inmate phone contains conventional telephone mechanical and electrical components mounted within a telephone housing, typically mounted on a wall, with the earpiece and mouthpiece mounted within the housing to serve as a hands-free telephone for safety. The inmates within a prison can no longer hang themselves with a handset cord or break off the handset and handset cord to use as a weapon. This phone reduces repairs by eliminating the need to fix and replace the telephone handset, thereby saving money for the cost of maintenance.

2. Description of the Prior Art

Numerous hands-free telephone equipment systems have been taught in prior art. U.S. Pat. No. 2,277,907 issued to Goodale, Jr. et al. discloses a speaker attachment for a conventional telephone. U.S. Pat. No. 3,144,513 issued to Sherron teaches a partially enclosed telephone stall with a microphone and speaker mounted in the enclosure wall of the booth. U.S. Pat. No. 4,101,735 issued to Bridenbaugh uses a shared transducer, alternatingly functioning as a speaker and a microphone, connected to a conventional telephone. U.S. Pat. No. 4,104,485 issued to Pessel et al. discloses a loudspeaker system mounted over a conventional telephone. None of the prior art utilizes a design for a telephone that can be wall mounted and is self-contained with minimal external parts as described herein.

BRIEF SUMMARY OF THE INVENTION

Accordingly, the objectives of this invention are to provide, inter alia, a new and improved telephone that:
  provides hands-free operation;
  is easy to use;
  is economical to manufacture;
  is resistant to vandalism and thus low-maintenance;
  can be mounted on a wall; and
  has no external cord, handset or other external parts that could be used as a weapon or means for vandalism or self-injury.

These objectives are accomplished by a mountable telephone that uses standard telecommunication and electronic components, including a push-button dialing pad, earpiece, mouthpiece, electronic circuitry, and switching circuitry.

To the accomplishment of the above and related objects, this invention may be embodied in the form illustrated in the accompanying drawings. The drawings are illustrative only, and changes may be made in the specific construction illustrated and described within the scope of the appended claims. Other objects of the invention will become apparent from time to time throughout the specification hereinafter disclosed.

BRIEF DESCRIPTION OF THE DRAWINGS

Similar reference characters denote corresponding features consistently throughout the attached drawings.

DETAILED DESCRIPTION OF THE INVENTION

Figure 1:
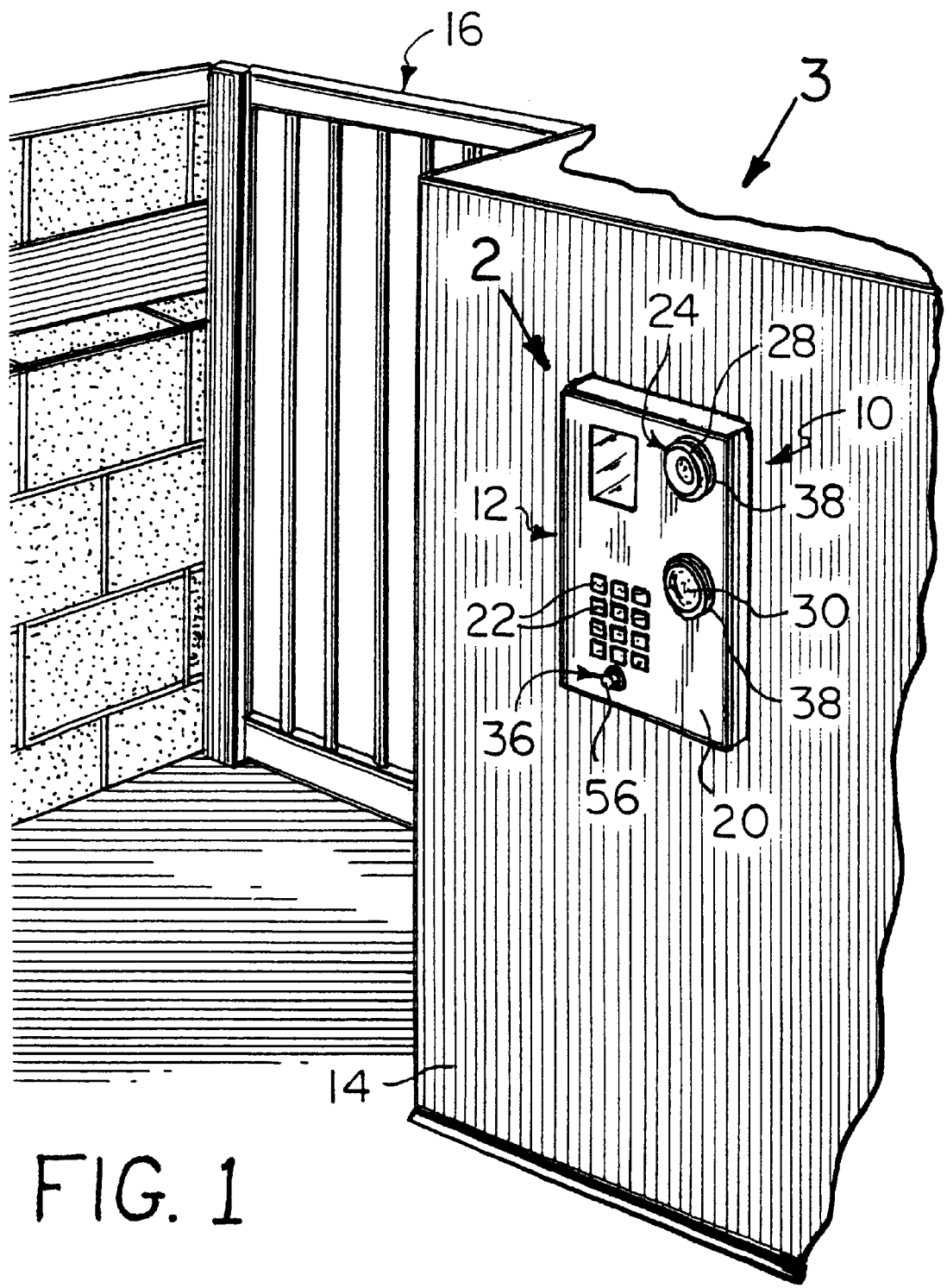
FIG. 1 is a perspective view of an interior portion of a prison, showing the present invention mounted into a wall thereof.
Figure 2:
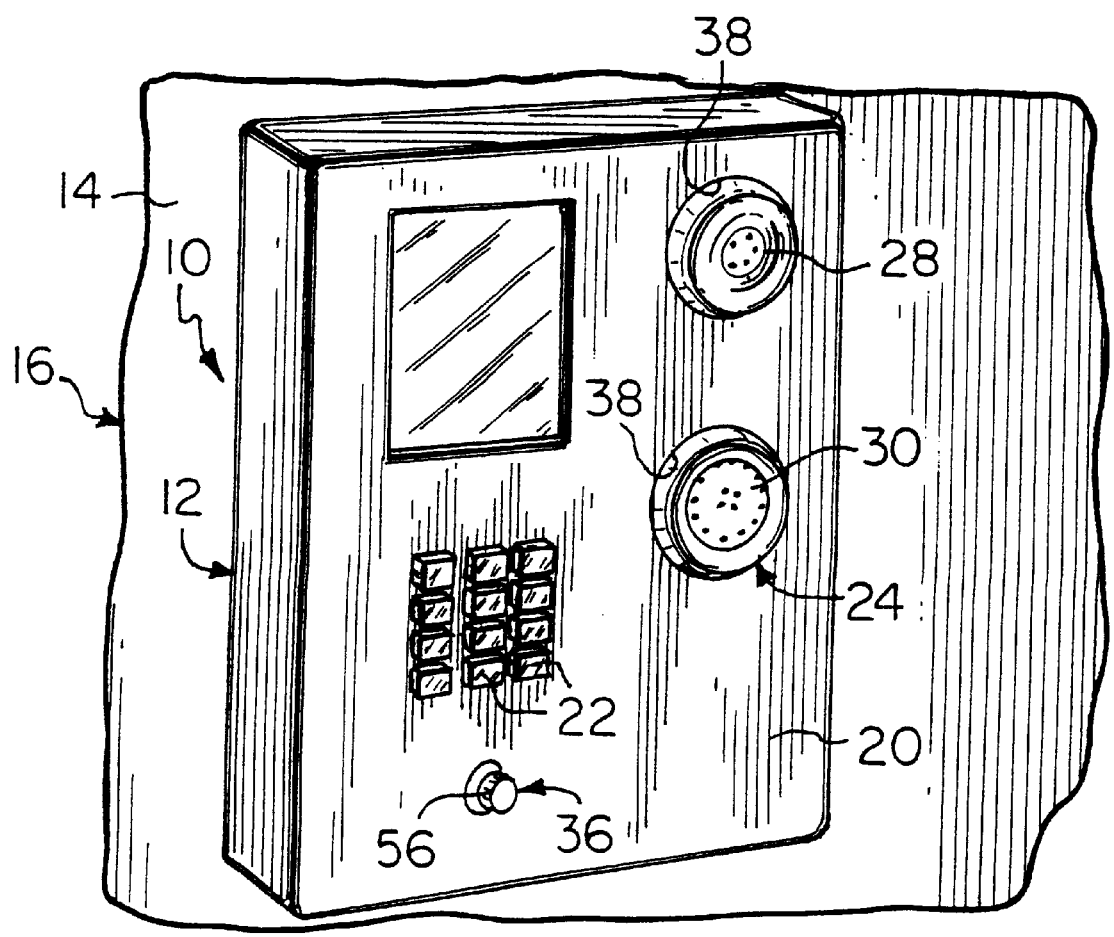
FIG. 2 is a front perspective view of the invention taken in the direction of arrow 2 in FIG. 1.
Figure 3:
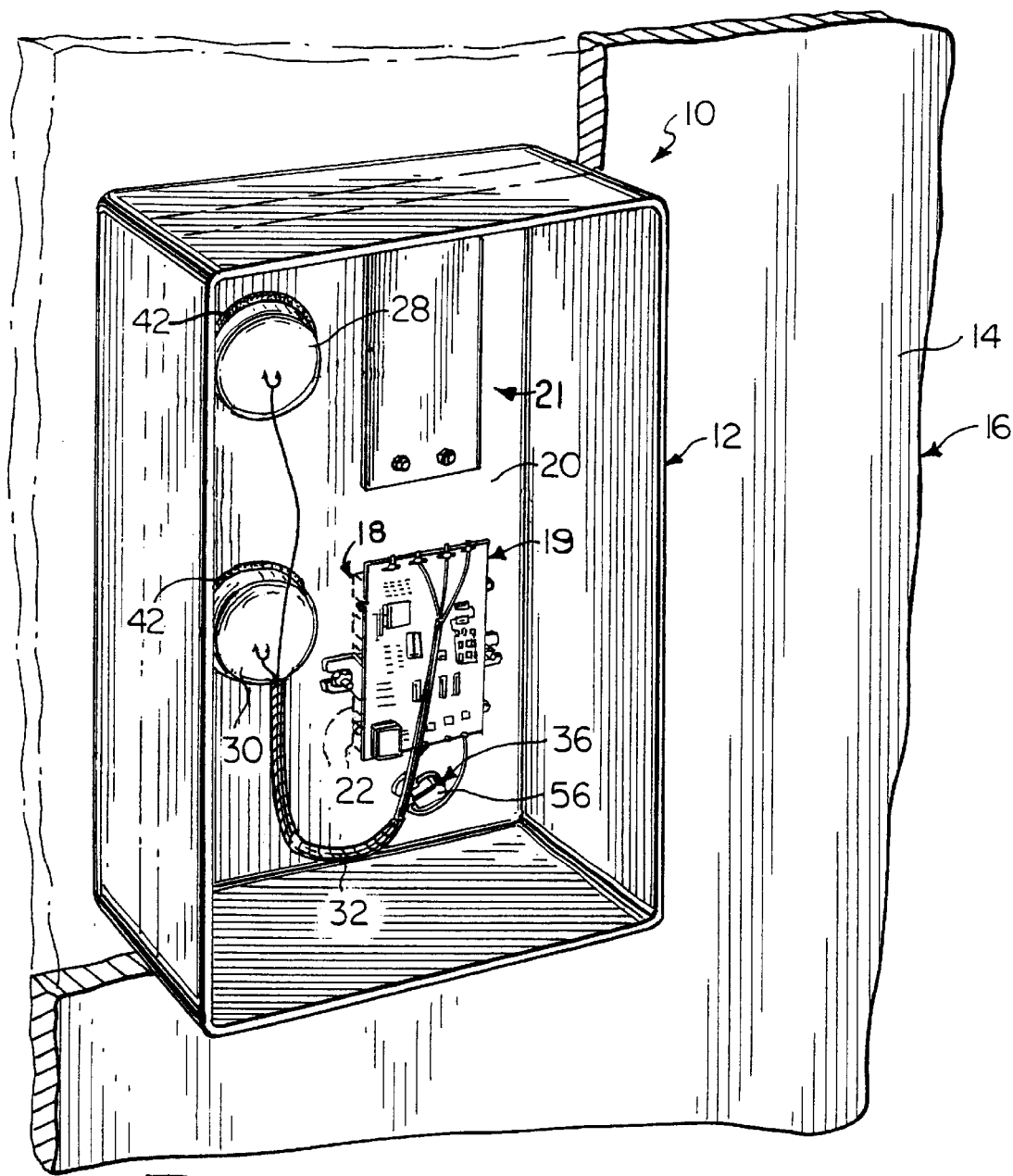
FIG. 3 is a rear perspective view of the invention taken in the direction of arrow 3 in FIG. 1.

The present invention is a telephone described as inmate phone 10, generally depicted in FIGS. 1–4, of the type having housing 12, capable of being mounted to a building wall, such as building wall 14 of prison 16. While inmate phone 10 is described as being mounted and used in prison 16, it is understood that inmate phone 10 may be used, mounted or free standing, in any location where a telephone is desired that encompasses the safety and security features described herein. Inmate phone 10 may be modified for use with coin or card payment mechanisms using standard methods and electrical/mechanical designs for this feature.

Typically, inmate phone 10 is mounted to building wall 14 by mechanical and locking attachment of housing 12 to a mounting plate (not shown) that is anchored to building wall 14. Housing 12 includes a housing front wall 20. Housing front wall 20 includes a front wall inner surface 21. Located within housing 12, and typically attached to front wall inner surface 21, are electronic circuit board 19, earpiece 28 and mouthpiece 30.

Typically, push-button dialing pad 18 is a component of electronic circuit board 19, which is mounted to the front wall inner surface 21. In an alternative embodiment, push-button dialing pad 18 can be separate from electronic circuit board 19 and electrically connected. A plurality of push-button digits 22 of push-button dialing pad 18 extends outward through push-button apertures 23 through housing front wall 20. Plurality of push-button digits 22 extend a sufficient distance to afford full travel distance for each of the push-button digits 22 to effect activation of the electric information switch associated with each push-button digit 22.

Aural output and input to inmate phone 10 is provided respectively by earpiece 28 and mouthpiece 30, both being mounted to the interior of housing front wall 20 and extending outward from housing front wall 20 through aural apertures 38. Earpiece 28 and mouthpiece 30 are each electrically connected to electronic circuit board 19 by connection wire 32. Earpiece 28 and mouthpiece 30 are mounted such that earpiece 28 is positioned above mouthpiece 30. Earpiece 28 and mouthpiece 30 are affixed to housing front wall 20 using any appropriate form of attachment known in the art. This means of attachment may be an adhesive, mechanical clamps (not shown) interior to housing 12, or any other means of attachment that provides secure mounting of earpiece 28 and mouthpiece 30 to housing 12 such that they can not be removed via the exterior of housing 12. In the preferred embodiment, earpiece 28 and mouthpiece 30 are sealed into aural apertures 38 by annular seal 42. Each annular seal 42 extends about earpiece 28 and mouthpiece 30 within the two vertically spaced apart apertures 38 in the housing front wall 20 of the housing 12.

In an alternative embodiment, earpiece 28 and mouthpiece 30 are mounted within inmate phone 10, preferably to front wall inner surface 21, such that no portion of earpiece 28 or mouthpiece 30 extend through housing front wall 20. In this embodiment, aural communication to earpiece 28 and mouthpiece 30 is afforded through a sound transparent section of housing front wall 20, such as a plurality of small holes (not shown). This sound transparent section provides protection to earpiece 28 and mouthpiece 30, while allowing sound to pass through.

Dial tone actuating switch 36 extends through housing front wall 20 of housing 12 via dial tone actuating switch aperture 37, for manually actuating the dial tone of the inmate phone 10. In the preferred embodiment, actuating component 36 is an on/off push-button switch 56 as is known in the art. Push button switch 56 may require constant pressure applied by the telephone user to maintain electrical circuit continuity, or may be a toggle push button requiring a first depression to actuate and a second depression to deactuate. In an alternative embodiment, actuating component 36 may be any on/off electrical switch capable of completing an electric circuit, including but not limited to a toggle lever switch, a relay or a breaker switch. However, it is a critical feature of actuating component 36 that it be of limited dimension to prevent injury to the user from being struck by actuating component 36 or its related structure, and for actuating component 36 to be ergonomically correct for proper usage. This ergonomic correctness includes proper positioning on housing front wall 20, proper throw distance of actuating component 36, and absence of surround structure, such as a phone hook, that creates an ergonomic hazard. Dial tone actuating switch 36 is electrically connected between phone line 58 and electronic circuit board 19. Typically, phone line 58, providing electrical access to the remote telephone routing switching equipment, enters housing 12 through the wall mounting plate (not shown) behind mounted housing 12, such that phone line 58 is not exposed to vandalism or environmental damage.

Earpiece 28, mouthpiece 30 and push-button dialing pad 18 are also electrically and functionally connected to electronic circuit board 19. Electronic circuit board 19 includes electronic components known in the art of telephone and electrical switching to receive electrical signals from mouthpiece 30 and phone line 58, to transmit electrical signals to earpiece 28 and phone line 58, and to receive and process electrical input from push-button dialing pad 18 for transmission to phone line 58. In the preferred embodiment, inmate phone 10 is capable of dialing out to another phone, but is not enabled to receive incoming phone calls.

Figure 4:
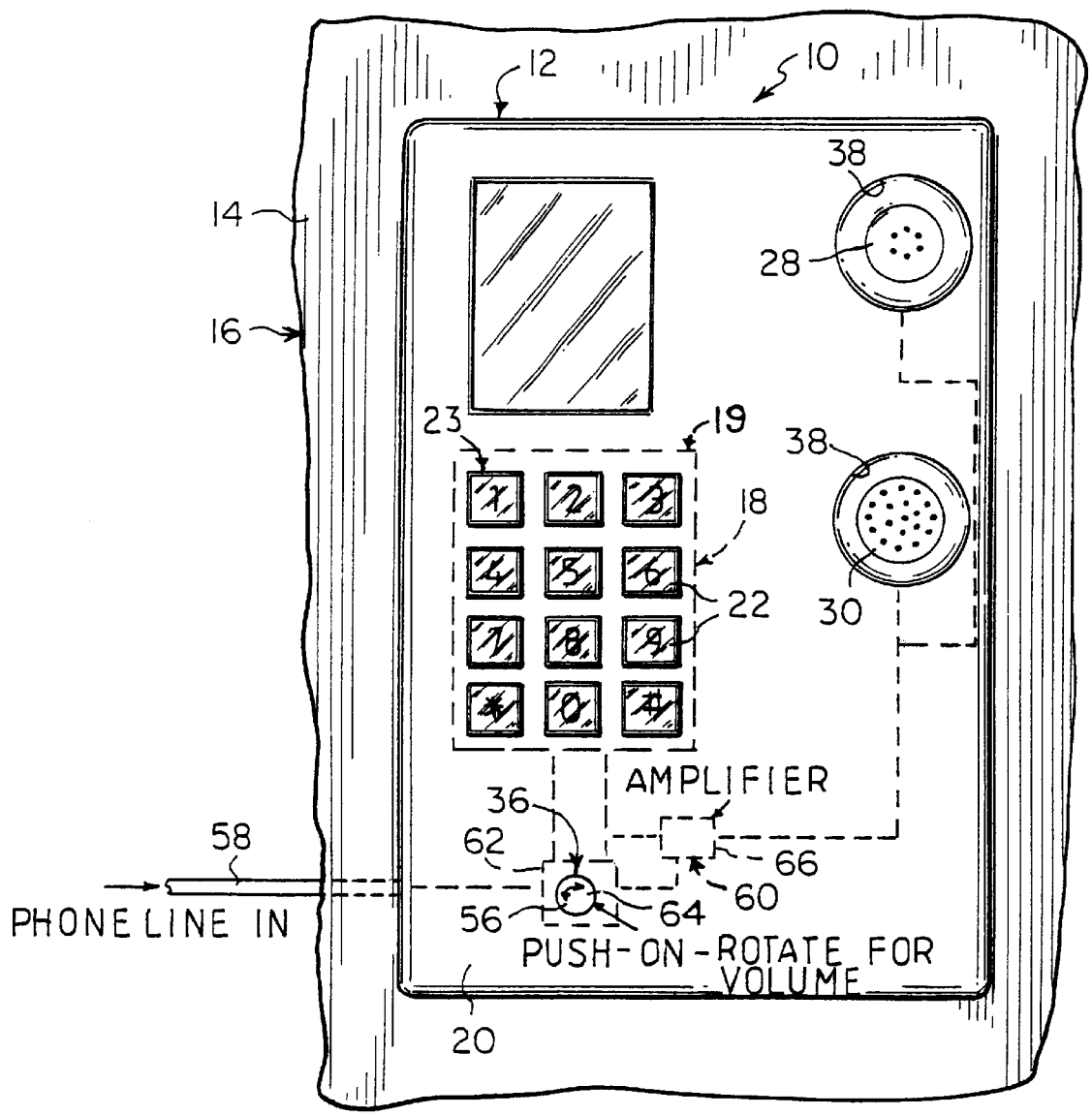
FIG. 4 is a front view of the invention, further showing diagrammatically an electrical circuit incorporating a volume control for the handset.

An assemblage 60, as shown in FIG. 4, can be electrically connected to earpiece 28 and mouthpiece 30 for increasing and decreasing sound coming out of earpiece 28 and sound going into mouthpiece 30. In one embodiment, the sound increasing and decreasing assemblage 60 consists of the on/off push-button switch 56 having a built-in volume control circuit 62 with a rotatable control knob 64.

Amplifier 66 is electrically connected between volume control circuit 62 and earpiece 28 and mouthpiece 30. Typically, amplifier 66 is a component of electronic circuit board 19. Typically, when the control knob 64 is manually rotated in a clockwise direction, the sound coming out of the earpiece 28 and the sound going into the mouthpiece 30 will be increased. When the control knob 64 is manually rotated in a counterclockwise direction, the sound coming out of the earpiece 28 and the sound going into the mouthpiece 30 will be decreased.

In the preferred embodiment, inmate phone 10 is mounted on building wall 14 at a height such that earpiece 28 is approximately level with the ear of an average height adult user. To use inmate phone 10, the user actuates actuating component 36. With actuating component 36 actuated, inmate phone 10 receives a dial tone and the user dials the desired phone number. The user then places his ear next to extended earpiece 28, or in the alternative embodiment next to the sound transparent section of housing front wall 20 in front of earpiece 28, to hear the person being called. The vertical orientation of mouthpiece 30 is such that mouthpiece 30 is ergonomically oriented below earpiece 28 for normal speech input into mouthpiece 30 when the user's ear is placed next to earpiece 28. In the preferred embodiment, the volume for earpiece 28 and mouthpiece 30 is controlled by control knob 64 as described above. When the call is finished, the user disengages actuating component 36, either by releasing it or by depressing it a second time, depending on the type of switch used for actuating component 36.

It is understood that each of the elements described above, or two or more together may also find a useful application in other types of methods differing from the type described above. While certain novel features of this invention have been shown and described are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A telephone for permanent mounting to a mounting surface in environments wherein the telephone is subject to abuse, comprising:

a housing, a mouthpiece, an earpiece, an electronic circuit board, a push-button dialing pad, a phone line and a dial tone actuating switch;

said housing including a housing front wall;

said housing front wall including a front wall inner surface;

said housing front wall including a plurality of aural apertures, a plurality of push-button apertures and a dial tone actuating switch aperture;

said mouthpiece and said earpiece mounted to said front wall;

said mouthpiece and said earpiece extending outward from said housing through said aural apertures such that a user places his ear next to said aperture for said earpiece;

said earpiece and said mouthpiece each being secured to said aural apertures by an annular seal;

said earpiece and said mouthpiece presenting an external relief surface for positioning said ear and a mouth of said user;

said mouthpiece and said earpiece electrically connected to said electronic circuit board;

said electronic circuit board further electrically connected to said push-button dialing pad, said phone line and said dial tone actuating switch;

said push-button dialing pad mounted to said front wall inner surface;

said push-button dialing pad including a plurality of push-button digits;

said push-button digits extending through said plurality of push-button apertures;

said dial tone actuating switch electrically connected to said phone line and said electronic circuit board;

said dial tone actuating switch mounted on said front wall inner surface and extending through said dial tone actuating switch aperture;

said phone line extending behind said mounting surface when said phone is in a mounted position;

and said phone operable in said mounted position by access to said mouthpiece, said earpiece, said dialing pad and said dial tone actuating switch.

2. A telephone as in claim 1, further including means electrically connected to the earpiece and the mouthpiece for increasing and decreasing sound coming out of the earpiece and sound going into the mouthpiece of the telephone handset.

3. A telephone as in claim 2, wherein said sound increasing and decreasing means includes:

said dial tone actuating switch having a built-in volume control circuit with a rotatable control knob; and an amplifier electrically connected between said volume control circuit, said mouthpiece, and said earpiece, such that manual rotation of said control knob selectively increases and decreases volume to and from said mouthpiece and said earpiece.

4. A telephone as in claim 1, wherein said telephone is mounted on a wall in a prison.

5. A telephone as in claim 1, wherein said telephone is mounted on a wall at a height and vertically oriented such that a user can stand adjacent said telephone with said user's ear proximate said earpiece and said user's mouth proximate said mouthpiece.

6. A telephone for permanent mounting to a mounting surface in environments wherein the telephone is subject to abuse, comprising:

a housing, a mouthpiece, an earpiece, in electronic circuit board, a push-button dialing pad, a phone line and a dial tone actuating switch;

said housing including a housing front wall;

said housing front wall including a plurality of aural apertures, a plurality of push-button apertures and a dial tone actuating switch aperture;

said mouthpiece and said earpiece mounted to said front wall;

said mouthpiece and said earpiece extending outward from said housing through said aural apertures;

said earpiece and said mouthpiece presenting an external relief surface for positioning said ear and a mouth of said user;

said mouthpiece and said earpiece electrically connected to said electronic circuit board;

said electronic circuit board further electrically connected to said push-button dialing pad, said phone line and said dial tone actuating switch;

said push-button dialing pad mounted to said front wall;

said push-button digits extending, through said plurality of push-button apertures;

said dial tone actuating switch electrically connected to said phone line and said electronic circuit board;

said dial tone actuating switch mounted on said front wall and extending through said dial tone actuating switch aperture;

said housing extending outward from a mounting surface when said telephone is in a mounted position;

said phone line extending behind said mounting surface when said telephone is in a mounted position; and access to said telephone for operation limited to said mouthpiece, said earpiece, said dialing pad and said dial tone actuating switch.

7. A telephone as in claim 6, further including;

volume control means electrically connected to the earpiece and the mouthpiece for increasing and decreasing sound coming out the earpiece and sound going into the mouthpiece of the telephone handset.

8. A telephone as in claim 6, wherein said telephone is mounted on a wall in a prison.

9. A telephone as in claim 6, wherein said telephone is mounted on a wall at a height and vertically oriented such that a user can stand adjacent said telephone with said user's ear proximate said earpiece and said user's mouth proximate said mouthpiece.

* * * * *